(No Model.)
C. E. MILLER.
DRAFT ATTACHMENT FOR VEHICLES.
No. 405,586. Patented June 18, 1889.
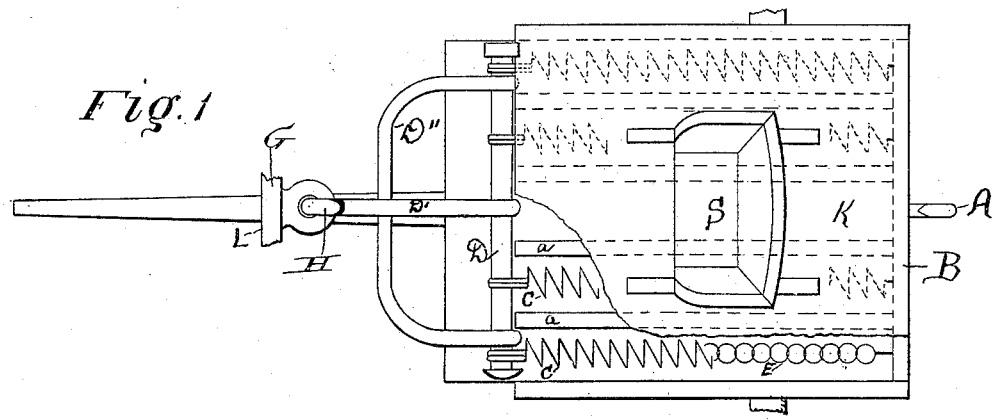
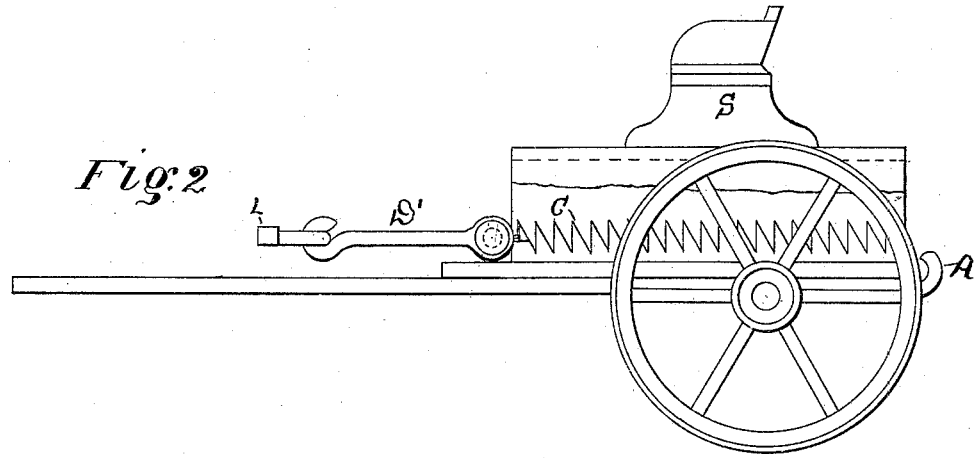
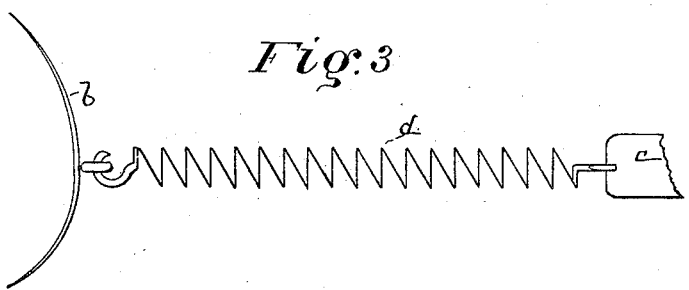
Witnesses
A. D. Allen
Geo. C. Steinbergh
Inventor
Charles E. Miller
By his Attorney
J. H. Gibbs

UNITED STATES PATENT OFFICE.

CHARLES E. MILLER, OF SYRACUSE, NEW YORK.

DRAFT ATTACHMENT FOR VEHICLES.

SPECIFICATION forming part of Letters Patent No. 405,586, dated June 18, 1889.

Application filed February 2, 1889. Serial No. 298,519. (No model.)

*To all whom it may concern:*

Be it known that I, CHARLES E. MILLER, of Syracuse, in the county of Onondaga, in the State of New York, have invented new and useful Improvements in Draft Attachments, of which the following, taken in connection with the accompanying drawings, is a full, clear, and exact description.

This invention relates to draft attachments for towing-carts, and is designed for use in heavy teaming on canals, &c., where great loads are drawn by means of animal-power; and it consists of certain details of construction in towing-carts, all as hereinafter more fully set forth, and particularly pointed out in the claims.

In making long trips on canals where animal-power is used it has been found that the dead strain on the horses is so great that the breasts and shoulders of said animals become galled and sore, thus necessitating frequent changes of animals and costing large sums of money for treatment and to replace said animals as they become unfit for service from said cause. It has been discovered that if some arrangement may be provided whereby the before-mentioned dead strain can be overcome this difficulty will be reduced to a minimum and great saving will be effected.

To this end I have invented the devices illustrated in the annexed drawings, wherein—

Figure 1 is a top plan view of the body of a towing-cart provided with my invention. Fig. 2 is a side view of the same, the cart in both views being partly broken away to better illustrate the same; and Fig. 3 represents a portion of the harness which I use as auxiliary to my principal invention.

At the forward end of the cart is provided a pole or a pair of thills, according as it is desired to use two or three horses in towing. The cart is simple in construction and consists merely of an axle and pair of wheels carrying a seat for the driver, with a bottom board above the axle carrying my new improvement.

Projecting rearwardly from the axle or from the box is a hook A, to which is attached the tow-line, running thence to the bow of the boat, to which it is attached. At the end of the cart, at the rear, is a cross bar or timber B, and to this are firmly secured several coil-springs C C, which extend forward longitudinally of the cart and are secured at their forward ends to a rod D, preferably of metal, extending nearly or quite across the width of the cart at its forward end. Running entirely through the springs C C are safety-chains E, secured to the cross-piece B and rod D. Secured to the rod D is the bowed frame D' D", to which the whiffletree-evener G is attached by means of the hook H; or in place of the frame D' D" of Fig. 1 a rod with hooked end (as D' of Fig. 2) may be used.

In practice I find it desirable that the springs C C may be held apart, so as to prevent interlocking; and to this end I provide the vertical partitions *a a*, which serve to form ways for the springs and also to strengthen the cart, as well as to support the seat S for the driver.

Heretofore it has been customary to hitch the tow-line directly to the evener of the whiffletrees, and in drawing boats out of locks or basins it has been necessary to employ more animals than are needed after the boats are under way, because when the boats are at rest and an attempt is made to start them the horses find such a great dead-weight to pull that they frequently balk and refuse to pull, owing to the great resistance to be overcome and which responds very slowly to their efforts, and the animals frequently settle back into their harness until urged on by the driver. They then plunge forward so quickly that the collars cause great sores on the breasts and shoulders, and the animals are soon unfitted for service.

When my improved cart is used, the strain is more evenly applied, and the horses, becoming encouraged at finding their efforts to meet with some success, will continue to draw with their full strength, and the boats are started without extra teams or injury to the animals.

When animals are hitched to the cart and the tow-line is secured to the hook A, the draft first comes on the springs C, which are stretched to their limit of safety, after which the strain is applied to the chains E, which, being secured to the cart, cause the same to be advanced, and with it the boat in tow.

In Fig. 3 is illustrated one of a pair of hames $b$, tugs $c$, and spring $d$, such as I use in the harness of towing-rigs, and running through said spring is a safety-chain secured to the hame and tug, so arranged that as the slack is taken up by stretching the spring the draft will come on said chain.

Having described my invention, what I claim is—

1. A towing-cart constructed with wheels, axle, and flooring, upon which are supported springs and safety-chains connected at their ends to the cart and to a draft-bar, in combination with a hook A, secured to the cart for connecting the tow-line, all constructed substantially as described and shown.

2. A towing-cart constructed with wheels, axle, and flooring, springs and safety-chains resting thereon, said springs being connected at their ends to the cart and to the draft-bar D, vertical partitions separating said springs, and a seat for the driver above the same, all constructed substantially as described and shown.

3. A towing-cart provided with a draft-bar D, springs C C, connected thereto and to the cart, safety-chains passing through said springs and connected in like manner, vertical partitions separating said springs, and hooks for the attachment of the whiffletrees and tow-line, all constructed and combined substantially as described and shown.

4. In a draft attachment, the combination of a draft-bar, springs, and safety-chains connected thereto and to a cross-bar to which the tow is connected, all constructed and arranged substantially as described and shown.

In testimony whereof I have hereunto signed my name, in the presence of two attesting witnesses, at Syracuse, in the county of Onondaga, in the State of New York, this 31st day of December, 1888.

CHARLES E. MILLER.

Witnesses:
FREDERICK H. GIBBS,
H. W. TYLER.